United States Patent [19]

Park et al.

[11] 4,129,698

[45] Dec. 12, 1978

[54] POLYMERS MODIFIED BY SULFOSUCCINAE ESTERS

[75] Inventors: Anthony J. Park, South Croydon; Alan C. Sturt, Guildford, both of England

[73] Assignee: BP Chemicals International Limited, London, England

[21] Appl. No.: 809,668

[22] Filed: Jun. 24, 1977

Related U.S. Application Data

[63] Continuation of Ser. No. 615,573, Sep. 22, 1977, abandoned, which is a continuation of Ser. No. 384,715, Aug. 1, 1973, abandoned.

[30] Foreign Application Priority Data

Aug. 16, 1972 [GB] United Kingdom ............... 38199/72
Aug. 16, 1972 [GB] United Kingdom ............... 38200/72

[51] Int. Cl.$^2$ ............................ C08F 6/14; C08F 2/26
[52] U.S. Cl. ........................................ 526/3; 526/214; 526/225; 526/344.2
[58] Field of Search ...................... 526/3, 30, 214, 225; 528/486, 487

[56] References Cited

U.S. PATENT DOCUMENTS

| | | | |
|---|---|---|---|
| 2,721,859 | 10/1955 | Fuhrman | 526/344 X |
| 3,120,505 | 2/1964 | McCubbin | 526/344 X |
| 3,208,965 | 9/1965 | Kuhne | 526/344 X |
| 3,324,097 | 6/1967 | Pears | 526/344 X |
| 3,451,960 | 6/1969 | Schmidt | 260/29.6 RB |
| 3,639,297 | 2/1972 | Steffen | 260/2.5 L |
| 3,640,918 | 2/1972 | Fuchs | 260/2.5 P |
| 3,642,740 | 2/1972 | Pierce | 526/344 X |

FOREIGN PATENT DOCUMENTS

834810  5/1960  United Kingdom ..................... 526/216

OTHER PUBLICATIONS

Smith, W. M., Vinyl Resins, Reinhold Publ. (N.Y.), pp. 97, 98, (Received in Patent Off. Dec. 1958).

*Primary Examiner*—C. A. Henderson
*Attorney, Agent, or Firm*—Brooks, Haidt, Haffner & Delahunty

[57] ABSTRACT

A vinyl halide paste polymer of low viscosity may be produced by adding a sulphosuccinate emulsifier to the polymer latex after microsuspension polymerisation but before isolation. This gives a polymer which can be made into a paste in known fashion.

9 Claims, No Drawings

POLYMERS MODIFIED BY SULFOSUCCINAE ESTERS

This is a continuation, of application Ser. No. 615,573, filed Sept. 22, 1977, which, in turn, is a continuation of Ser. No. 384,715 filed Aug. 1, 1973, boath of said applications now abandoned.

The present invention relates to a process for the production of a vinyl halide paste forming polymer.

Paste forming vinyl halide polymers are well known. They are derived from vinyl halide polymer latices. The polymers are normally recovered from such latices by spray-drying, and then ground and mixed with plasticisers to form smooth pastes which can be spread or moulded and finally formed into fabricated solid products by heating. A very important property of the pastes is the paste viscosity, which for example in a high speed coating process largely controls the speed at which the paste can be spread. In this type of process low viscosity may therefore be required. The major factor in controlling viscosity is particle size and distribution but it is known to add glycol ethers to the polymer latex before spray-drying to depress the paste viscosity. Paste viscosity varies with the shear applied, and for high speed spreading applications it is important that the viscosity at high shear should be low.

It is an object of the present invention to produce an improved paste polymer.

Accordingly, the present invention is a process for the production of a vinyl halide paste forming polymer which process comprises adding a sulphosuccinate emulsifier to a paste forming vinyl halide polymer latex after microsuspension polymerisation to form the latex is substantially complete and isolating the paste forming polymer in the presence of said emulsifier.

Any sulphosuccinate emulsifier may be used.

Preferred sulphosuccinates are the esters having from 2 to 22 and most preferably from 4 to 16 carbon atoms per molecule.

As little as 0.1% of emulsifier by weight of polymer may have a useful effect but 0.2% by weight and most preferably in the range 0.4 to 1.0% is added. These preferred levels are appropriate when the emulsifiers are used alone or mixed with each other. Lower levels may be used if the emulsifier is used together with known glycol ether viscosity depressants. The emulsifier must be added to the latex after polymerisation to form the latex is substantially complete and is thus distinct from the emulsifier used to disperse the monomer from which the latex is formed. It should be added before isolation as it is thought to be necessary to coat the polymer particles with the emulsifier which cannot be conveniently achieved after isolation. The temperature at which the emulsifier is added is not critical and temperature in the range 5° C.-95° C. are perfectly suitable.

The vinyl halide paste forming polymer may contain up to 30% by weight of copolymerised monomer. Examples of copolymerisable monomers are ethylene, propylene, vinyl acetate, vinyl laurate, vinyl stearate and vinylidene chloride. The process of the present invention is particularly applicable to latices of homopolymers of vinyl chloride and copolymers of vinyl chloride with less than 20% by weight of other copolymerisable materials.

The latex may be any suitable latex of paste forming polymer prepared by micro-suspension polymerisation in well-known fashion. Particularly suitable are latices prepared by the micro-suspension techniques where a monomer soluble initiator is used.

The paste forming polymer may be isolated by any technique that does not involve separation of the added emulsifier from the polymer. It will be appreciated that during the isolation procedure the precise chemical form of the emulsifier may be changed. However, so long as the emulsifier or its essential residue, e.g. the alkyl ether sulphate residue or the sulphosuccinate residue, remains with the polymer good results are obtained. The most usual method is to spray dry the latex. After spray drying it is usually necessary to grind the polymer to break up large agglomerates which may effect the spreading process of otherwise spoil the final product.

Pastes can be made from paste forming polymers produced according to the present invention by mixing with plasticisers in well-known fasion. It is generally found that with the paste forming polymers of the present invention the viscosity of the paste formed is reduced compared with the addition of the same amount of emulsifier during polymerisation. The reduction in viscosity is however, sometimes subject to an ageing effect. For example, the viscosity of the paste may increase on standing. However, the addition of the emulsifier tends to reduce the variation of viscosity ageing of the paste.

The following examples illustrate the process of the present invention and the properties of the products thereof.

EXAMPLE 1-5

A latex was prepared by micro-suspension techniques using sodium lauryl sulphate as the major emulsifier. Latex particles up to 1.5 μm in diameter were obtained.

The latex was divided into six portions. One portion was spray-dried on a Kestner spray drier with air temperatures of 130° C. (inlet) and 60° C. (outlet). To the other portions aqueous solutions of sodium dioctyl sulphosuccinate (Trade Name Manoxol OT) with stirring to give levels of 0.2, 0.5, 1.0, 2.0 and 4.8 parts by weight/100 PVC. They were then spray-dried under the same conditions as the first portion.

The dried polymers were ground using an Alpine pin mill. Plastisols were prepared by mixing the polymers (100 parts by weight) with dioctyl phthalate (60 parts by weight) using a Hobart mixer.

Plastisol viscosity measurements were made after ageing for 1, 24, and 168 hours at 23° C. using a Haake Rotovisko viscometer fitted with cone and plate attachments and a Brookfield model RVT viscometer. Measurements were recorded at 20 rpm (Brookfield) and $1000s^{-1}$ (Rotovisko) and are shown in Table 1. It can be seen that as little as 0.2 parts gave significant reductions of viscosity at low and high shear rates.

Table 1

| Example No. | Level of dioctyl sulphosuccinate (parts/100 of PVC) | Brookfield viscosity ($Nsm^{-2}$) 20 rpm. | | | Rotovisko viscosity $1000^{-1}$ ($Nsm^{-2}$) | | |
|---|---|---|---|---|---|---|---|
| | | 1hr | 24hr | 168hr | 1hr | 24hr | 168hr |
| Comparative | 0 | 10.4 | 17.9 | 26.5 | 9.3 | 10.0 | 11.8 |
| 5 | 0.2 | 5.2 | 8.5 | 11.6 | 7.9 | 9.4 | 10.3 |
| 6 | 0.5 | 4.4 | 6.5 | 8.4 | 8.0 | 7.5 | 9.6 |
| 7 | 1 | 4.4 | 6.3 | 9.4 | 7.9 | 8.6 | 8.8 |
| 8 | 2 | 3.9 | 5.4 | 7.2 | 6.4 | 6.7 | 7.2 |

Table 1-continued

| Example No. | Level of dioctyl sulpho-succinate (parts/100 of PVC) | Brookfield viscosity (Nsm$^{-2}$) 20 rpm. | | | Rotovisko viscosity 1000$^{-1}$ (Nsm$^{-2}$) | | |
|---|---|---|---|---|---|---|---|
| | | 1hr | 24hr | 168hr | 1hr | 24hr | 168hr |
| Comparative 9 | 4.8 | 3.3 | 4.7 | 6.3 | 5.0 | 5.7 | 6.1 |

EXAMPLE 6

A latex was prepared in Examples 1-5.

The latex was divided into two portions. One portion was spray-dried using the same conditions as Examples 1-5. To the other portion an aqueous solution of sodium di-terdecyl sulphosuccinate (Trade Name Aerosol TR) was added with stirring to give 1 part by weight active/100 parts of PVC. It was then spray-dried using Kestner Laboratory spray drier with air temperatures of 130° C. (input) and 60° C. (output).

The dried polymers were ground using an Alpine pin mill. Plastisols were prepared as in Examples 1-5.

Plastisol viscosity measurements were made as in Examples 1-5 and are shown in Table 12. It can be seen that the polymers to which the sulphosuccinate had been added gave significantly lower paste viscosities at both and low shear rates.

Table 12

| Level of diterdecyl sulphosuccinate (parts/100 of PVC) | Brookfield viscosity (Nsm$^{-2}$) 20 rpm | | | Rotovisko viscosity 1000$^{-1}$ | | |
|---|---|---|---|---|---|---|
| | 1hr. | 24hr. | 168hr. | 1hr. | 24hr. | 168hr. |
| 0 | 10.4 | 17.9 | 26.5 | 9.3 | 10.0 | 11.8 |
| 1 | 4.7 | 5.9 | 7.5 | 7.7 | 8.5 | 8.8 |

EXAMPLE 7

A PVC homopolymer latex was made with sodium decylbenzene sulphonate using conventional emulsion polymerisation techniques to give a particle size of about 0.23 μm. The latex was divided into two aliquots and to one a solution of sodium dioctyl sulphosuccinate (Trade Name — Monoxol OT) was added with stirring to give a ratio of 1 parts of sulphosuccinate/100 parts of PVC resin. Both aliquots were then spray-dried in a Kestner laboratory spray drier with air temperatures of 130° C. (input) and 60° C. (output). The resins were ground in an Alpine Kelloplex pin mill and mixed with dioctyl phthalate in a ratio of 100 parts wt. polymer/82 parts wt. plasticiser in a Hobart mixer. The Brookfield viscosity of the plastisols (spindle 7 and 0.5 rpm) after 24 hrs. at 23° C. were as follows:

Without post added sulphosuccinate 7,680 Nsm$^{-2}$
With post added of sulphosuccinate 4,800 Msm$^{-2}$ Post addition of the sulphosuccinate clearly reduced the paste viscosity.

Comparative Test

A PVC homopolymer latex was made by conventional emulsion polymerisation techniques using ammonium laurate as emulsifier in the same way as in Example 3. The particle size of the latex was about 0.2 μm. The latex was divided into three aliquots. To one aliquot a solution of Warolet U ($C_{16}$ - $C_{18}$ is alkyl sulphonate made by Farbenfabriken Bayer) was added with stirring to give a ratio of 1 part Warolat U/100 parts PVC by weight. To a second aliquot a solution of potassium laurate was added to give a similar ratio. The three aliquots were then spray-dried in a Kestner laboratory spray drier with air temperatures of 130° C. (input) and 60° C. (output). Plastisols were made from the dried materials by mixing 100 parts of the polymers with 82 parts by weight of dioctyl phthalate in a Hobart mixer. Plastisol viscosity measurements were made after 1 hr. using a Haake Rotovisko fitted with a cup and bob at a shear rate of 1s$^{-1}$. The results were as follows:

No post addition 24.7 Nsm$^{-2}$
Post-addition with Warolat U 29.5 Nsm$^{-2}$
Post-addition with potassium laurate 79.5 Nsm$^{-2}$ The post-additives did not reduce past viscosities.

EXAMPLE 8

Comparative Test

A latex was prepared by micro-suspension techniques using sodium lauryl sulphate as the major emulsifier. Latex particles up to 1.5 μm were obtained. The latex was divided into three portions. To one portion was added a solution of Strodex PK90, a phosphate based emulsifier, to give a weight ratio of 1 part of Strodex/100 parts of PVC. To another a solution of Manoxol OT, sodium dioctyl sulphosuccinate was added to give the same ratio. All three aliquots were then spray dried, ground and made into plastisols as in Example 2. The Brookfield viscosities were then measured after 1 and 24 hrs. at 23° C. The results were as follows:

| Post-addition | Nsm$^{-1}$ | |
|---|---|---|
| | 1 hr. | 24 hr. |
| None | 10.4 | 17.9 |
| Strodex PK90 | 12.0 | 20.3 |
| Manoxol OT | 4.4 | 6.2 |

Manoxol OT clearly reduced the viscosity while the Strodex PK90 in fact produced a small increase of viscosity.

We claim:

1. A process for the production of a vinyl chloride paste forming polymer having reduced paste viscosity at high and low shear which comprises preparing a paste forming vinyl chloride polymer latex by microsuspension polymerization using an emulsifier other than a sulfosuccinate during said polymerization, adding a sulfosuccinate emulsifier to said paste forming vinyl chloride latex after polymerization is substantially complete and then subsequently isolating as particles the paste forming polymer in the presence of said emulsifier.

2. A process as defined in claim 1 wherein an alkali metal or ammonium lauryl sulfate is used as an emulsifier during said polymerization.

3. A process according to claim 1 where the emulsifier is a sulphosuccinate ester having from 4 to 16 carbon atoms per molecule.

4. A process according to claim 1 where the amount of emulsifier used lies in the range 0.4 to 1.0% by weight.

5. A process according to claim 1 where the latex is of a homopolymer of vinyl chloride or a copolymer of vinyl chloride with less than 20% by weight of other copolymerisable materials.

6. A process as defined in claim 1 wherein said sulphosuccinate emulsifier is sodium dioctyl sulphosuccinate.

7. A process according to claim 1 where the latex is isolated by spray drying.

8. A process according to claim 7 where the polymer is ground after spray drying.

9. A process as defined in claim 1 wherein said sulphosuccinate emulsifier is sodium diterdecyl sulphosuccinate.

* * * * *